United States Patent [19]

Langford

[11] Patent Number: 4,823,852
[45] Date of Patent: Apr. 25, 1989

[54] TREE FELLER-BUNCHER

[75] Inventor: Frederic E. Langford, Redmond, Wash.

[73] Assignee: Allied Systems Company, Sherwood, Oreg.

[21] Appl. No.: 149,650

[22] Filed: Jan. 28, 1988

Related U.S. Application Data

[62] Division of Ser. No. 11,518, Feb. 5, 1987, Pat. No. 4,763,742.

[51] Int. Cl.[4] .......................... B60P 1/18; B62D 55/08
[52] U.S. Cl. .................... 144/3 D; 180/9.1; 180/41; 180/89.14; 280/6.12
[58] Field of Search ............. 280/763.1, 6 H; 180/9.1, 8.1, 41, 89.14; 414/23, 687; 144/3 D, 3 E, 34 R, 34 E

[56] References Cited

U.S. PATENT DOCUMENTS

| Re. 26,802 | 2/1970 | Symons et al. | 180/136 |
|---|---|---|---|
| 3,102,562 | 9/1963 | Horncastle | 144/34 R X |
| 3,233,909 | 2/1966 | Boone | 280/6 H |
| 3,385,389 | 5/1968 | Symons et al. | 180/136 |
| 3,450,006 | 6/1969 | White | 91/401 |
| 3,498,350 | 3/1970 | Maradyn | 144/338 |
| 3,515,297 | 6/1970 | Symons | 254/326 |
| 3,531,235 | 9/1970 | Boyd et al. | 144/2 R |
| 3,572,746 | 2/1971 | Mueller | 280/112 R |
| 3,590,760 | 7/1971 | Boyd et al. | 144/34 E X |
| 3,590,894 | 7/1971 | Boyd et al. | 144/134 E |
| 3,599,801 | 8/1971 | Roll et al. | 212/162 |
| 3,601,169 | 8/1971 | Hamilton et al. | 144/34 R |
| 3,620,394 | 11/1971 | Symons et al. | 414/561 |
| 3,670,834 | 6/1972 | Rogers | 180/41 |
| 3,708,000 | 1/1973 | Duffty et al. | 144/3 D |
| 3,708,008 | 1/1973 | Schildmeier | 157/13 |
| 3,720,245 | 3/1973 | Puna | 144/34 R X |
| 3,727,653 | 4/1973 | Tucek | 144/34 R X |
| 3,763,905 | 10/1973 | Hamilton et al. | 144/3 D |
| 3,796,241 | 3/1974 | Golob et al. | 144/3 D |
| 3,977,547 | 8/1976 | Holopainen | 414/687 |
| 4,046,179 | 9/1977 | Crawford | 144/34 E |
| 4,063,359 | 12/1977 | Luscombe | 144/34 R X |
| 4,326,571 | 4/1982 | Crawford | 144/34 E |
| 4,650,017 | 3/1987 | Pelletier et al. | 180/9.1 |
| 4,679,803 | 7/1987 | Biller et al. | 280/6 H |

Primary Examiner—Charles A. Marmor
Assistant Examiner—Mitchell J. Hill
Attorney, Agent, or Firm—Marger & Johnson

[57] ABSTRACT

A four track vehicle especially adapted for logging on steep slopes includes a running unit and an upper unit. The upper unit is articulated relative to the lower unit to maintain a center of gravity within the four tracked pods upon which the running unit is mounted. Sensing systems are utilized to alert the operator when the machine is in an incipient tipping condition. Moreover, a unique suspension system combining a torsion frame and swingable pod mounting arms are employed. The pods are locked in position when the vehicle is in an operating mode and are unlocked when the vehicle is in a travel mode.

22 Claims, 10 Drawing Sheets

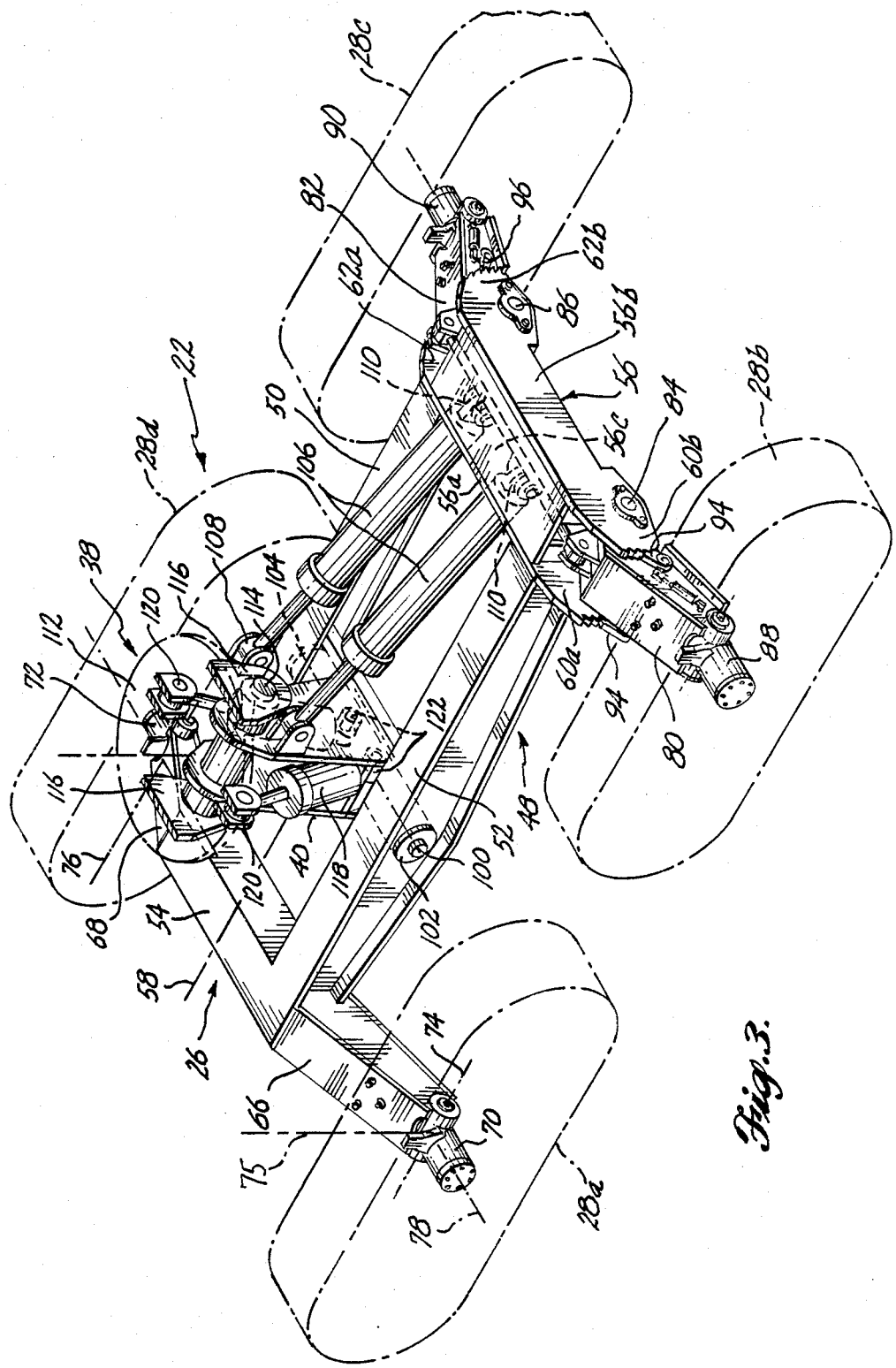

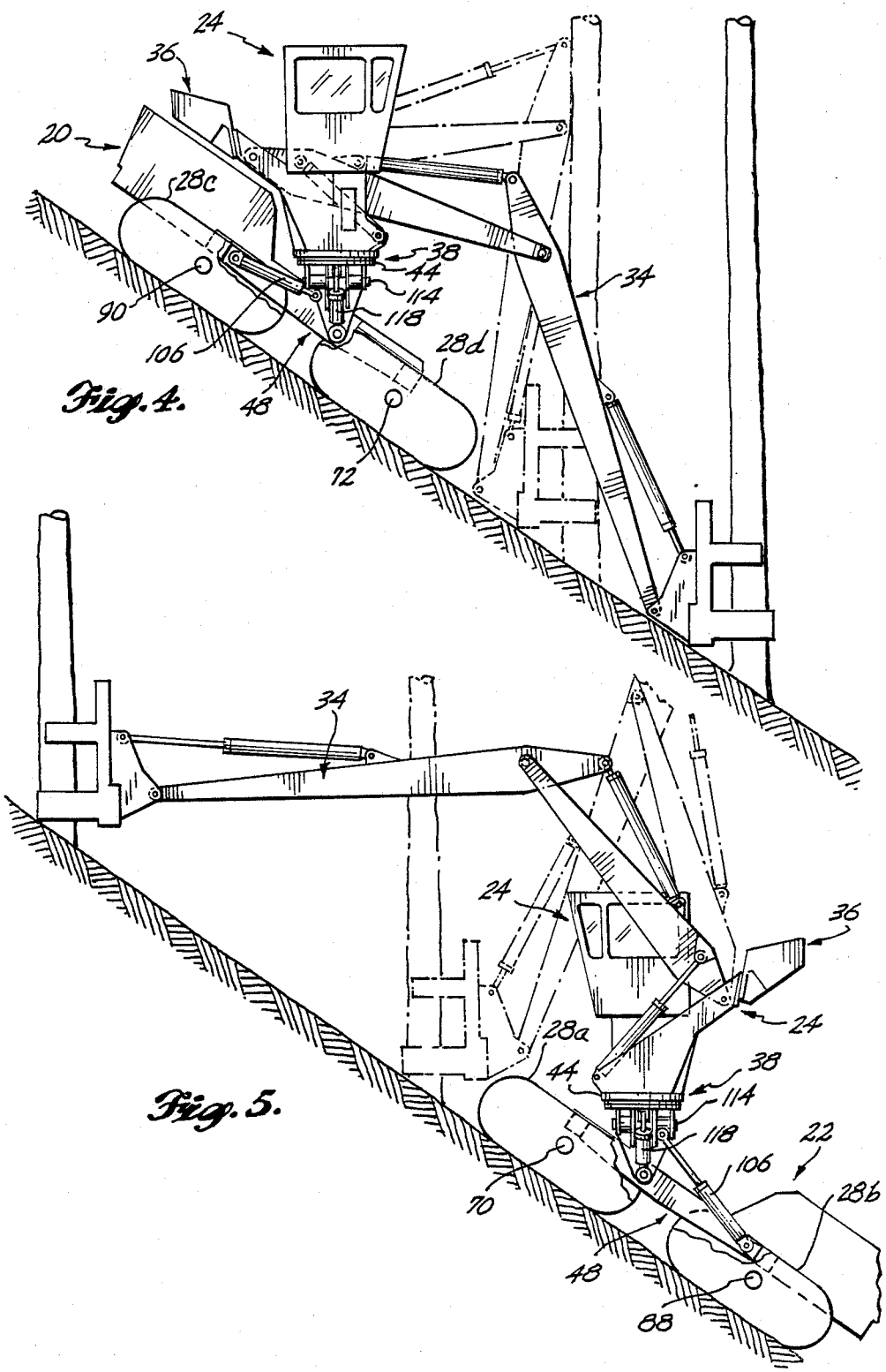

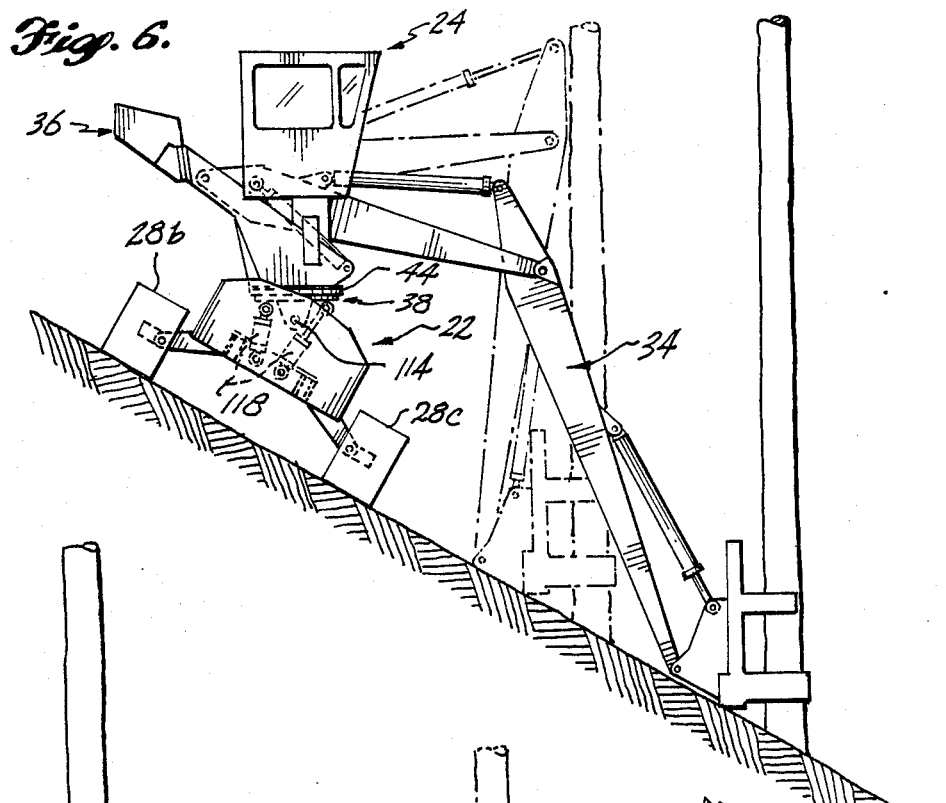
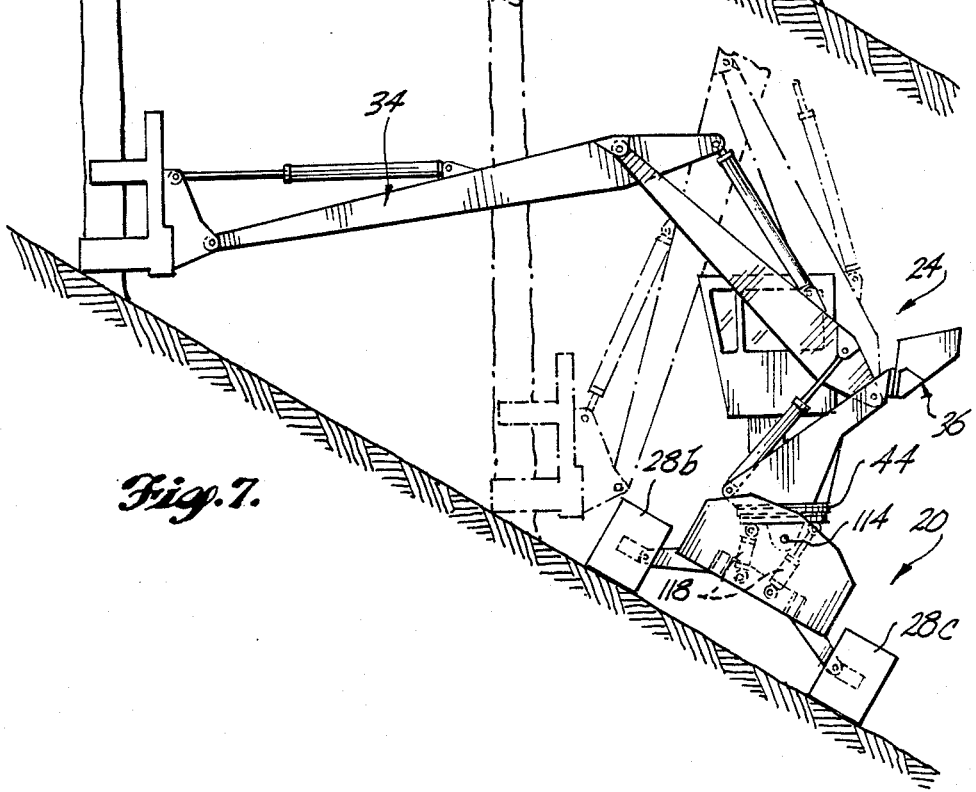

TREE FELLER-BUNCHER

This is a division of application Ser. No. 011,518 filed Feb. 5, 1987 now U.S. Pat. No. 4,763,742, issued Aug. 16, 1988.

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyrights whatsoever.

BACKGROUND OF THE INVENTION

The present invention relates to a device for felling and gathering trees and, more particularly, to a vehicle that is capable of operating on relatively steep slopes without danger of upsetting, thus increasing the safety and decreasing the cost of operation of such machines while expanding the area over which it can operate.

In the past, large trees have been logged from an area using yarders or skidders for moving trees out of a given area to a landing. In the past, trees were separately felled by saws and were usually attached one at a time or in bunches for delivery to the landing. Second and third growth timber, which is comprised of trees that are smaller and of more uniform size than virgin timber is now being logged. This has allowed a change in logging practices whereby a single machine can fell one or more trees and bunch several trees together for more efficient delivery to the landing.

Accordingly, a new class of vehicle referred to as a feller-buncher has been created to fulfill the need in the logging industry to fell generally uniformly sized trees to bunch them together in preparation for transport. Many of these vehicles generally comprise an articulated arm that is mounted on a platform, which is in turn mounted on a turntable that can rotate 360 degrees relative to the chassis upon which the turntable is mounted. Early feller-bunchers had the platform mounted rigidly to the frame, causing a significant shift of the center of gravity of the machine when it attempted to operate on steep slopes, thus limiting the extent to which the articulated boom could be extended beyond the chassis, especially in a downhill direction. More recent feller-bunchers have the turntable mounted on a trunnion system that allows the platform and an associated counterweight to be moved in a direction opposite to the angulation of the chassis relative to the horizontal, thus maintaining the cab and counterweight in an upright position and shifting the center of gravity back toward the center of the vehicle. Because of chassis design and other limitations in prior feller-bunchers, however, only limited success has been met in shifting the center of gravity so that operation over a wide variety of steep terrain can still be maintained. Moreoever, prior feller-bunchers have not incorporated systems whereby the operators are given an indication that tipping of the machine is imminent, or that incorporate systems that can, to a large degree, prevent the device from being operated in a mode that would allow it to tip. There has also been a need to develop more sophisticated suspensions and suspension control systems so that the machines can be operated efficiently and safely not only on steep hill sides, but on terrain that is very uneven and replete with obstacles.

SUMMARY OF THE INVENTION

The present invention provides a feller-buncher for logging trees that is capable of operating on steep slopes and uneven terrain. The configuration of the machine, including the trunnion arrangement, the compact upper unit and the layout of the carrier or chassis, allows the upper unit to be leveled to a degree greater than prior machines. In addition, the geometry of the trunnion system that mounts the upper unit on the chassis, allows the center of gravity of the machine plus its rated load to be adjusted to increase the machine's stability when working on steep slopes. This aspect of the invention is provided by a frame having a longitudinal dimension and a transverse dimension. First, second, third and fourth arms are mounted on the frame and extend transversely outwardly from the four corners of the frame. First, second, third and fourth pods carrying endless tracks are connected to the outer ends of respective arms. The vehicle also includes a first trunnion and means for mounting the first trunnion to a central portion of the frame for swinging movement about a transverse axis, which is positioned below the upper level of the frame. A second trunnion is mounted on the first trunnion for swinging movement about an axis oriented longitudinally relative to the frame. A turntable is mounted on the second trunnion for rotational movement about a generally upright axis. The upper unit, including the cab and articulated arm, is mounted on the turntable. In this arrangement, the pods are offset from the trunnions sufficiently in both a longitudinal and transverse direction to allow the center of gravity of the entire vehicle plus its rated load to remain inside vertical lines running through the pods when the frame is angulated up to 35 degrees relative to the horizontal.

An advantage of the present invention is that the independently powered oscillating pod-type track system allows the track to conform to rough ground conditions and gives more ground contact. This arrangement results in a uniform pressure distribution on the ground and better traction. More specifically, the track system is provided by independently mounting the first, second, third and fourth pods to their respective first, second, third and fourth arms for pivotal movement about substantially parallel axes that are oriented transversely to the frame.

Another aspect of the present invention is provided by a unique suspension system that employs a torsional frame, a movable rear suspension, and a stability lock system that is unique to crawler-type machines. This suspension is provided by a box frame having at least one pair of spaced longitudinal members and one pair of spaced transverse members interconnecting the longitudinal members to form a semirigid frame capable of limited twisting about a generally longitudinal axis. First and second rigid arms extend transversely outwardly from opposite sides of the box frame adjacent its front end. First and second pivot arms extend transversely outwardly from opposite sides of the frame adjacent the opposite, or rear, end of the frame. Means are provided for mounting each of the first and second pivot arms to the frame for swinging movement about first longitudinal axes offset from the longitudinal centerline of the frame. These arms are tied together by a link, the ends of which are pivotally coupled to the first and second pivot arms at locations vertically offset from the pivotal connection of the pivot arms to the frame. Track pods are mounted to the outer ends of each of the arms. This flexible suspension system allows the tracks to have good ground bearing when traveling and allows the front pods to angulate relative to the rear pods, partially through torquing of the frame and partially through the relative movement of the pivot arms and the frame. An automatic stability lock system also locks the pivot arms so that they cannot pivot when the machine is in a stationary mode. The stability locks are deactivated when the machine is in a travel mode. The stability locks are also selectively deactivated in response to the unweighting of the pods attached to the rigid pivot arms so that the locks cannot be wedged into a locked position.

The feller-buncher constructed in accordance with the present invention also employs a novel stability sensing system that determines when the machine has reached an incipient tip condition. The sensing system provides an output signal that can be used to give an audible or visual alarm to warn the operator of the vehicle of an incipient tip condition, or to disengage, for example, certain of the hydraulic systems that would aggrevate the tip condition. The sensing system includes first, second, third and fourth means associated with respective ones of the first, second, third and fourth pods for independently providing a control signal indicating unweighting of a pod. The control signal is fed to a logic circuit that provides an output signal when the control signals from the four control signal providing means indicate the unweighting of any two adjacent pods. If desired, the system can be adjusted to vary the set point of the incipient tip condition. The warning system is especially adapted for use of feller-bunchers because of their use on steep uneven slopes.

BRIEF DESCRIPTION OF THE DRAWINGS

A better understanding of the present invention can be derived by reading the ensuing specification in conjunction with the accompanying drawings wherein:

FIG. 3 is an isometric view of the trunnion mounts, box frame and suspension system constructed in accordance with the present invention;

FIG. 4 is a side elevation view showing the feller-buncher operating on a steep down slope;

FIG. 5 is a side elevation view showing the feller-buncher operating on a steep up slope;

FIG. 6 is a rear elevation view showing the feller-buncher working on a steep slope with the boom on the right-hand side, down slope side of the machine;

FIG. 7 is a rear elevation view of the feller-buncher working on a steep slope with the boom on the left-hand, up slope side of the machine;

DETAILED DESCRIPTION OF THE INVENTION

Figure 1:
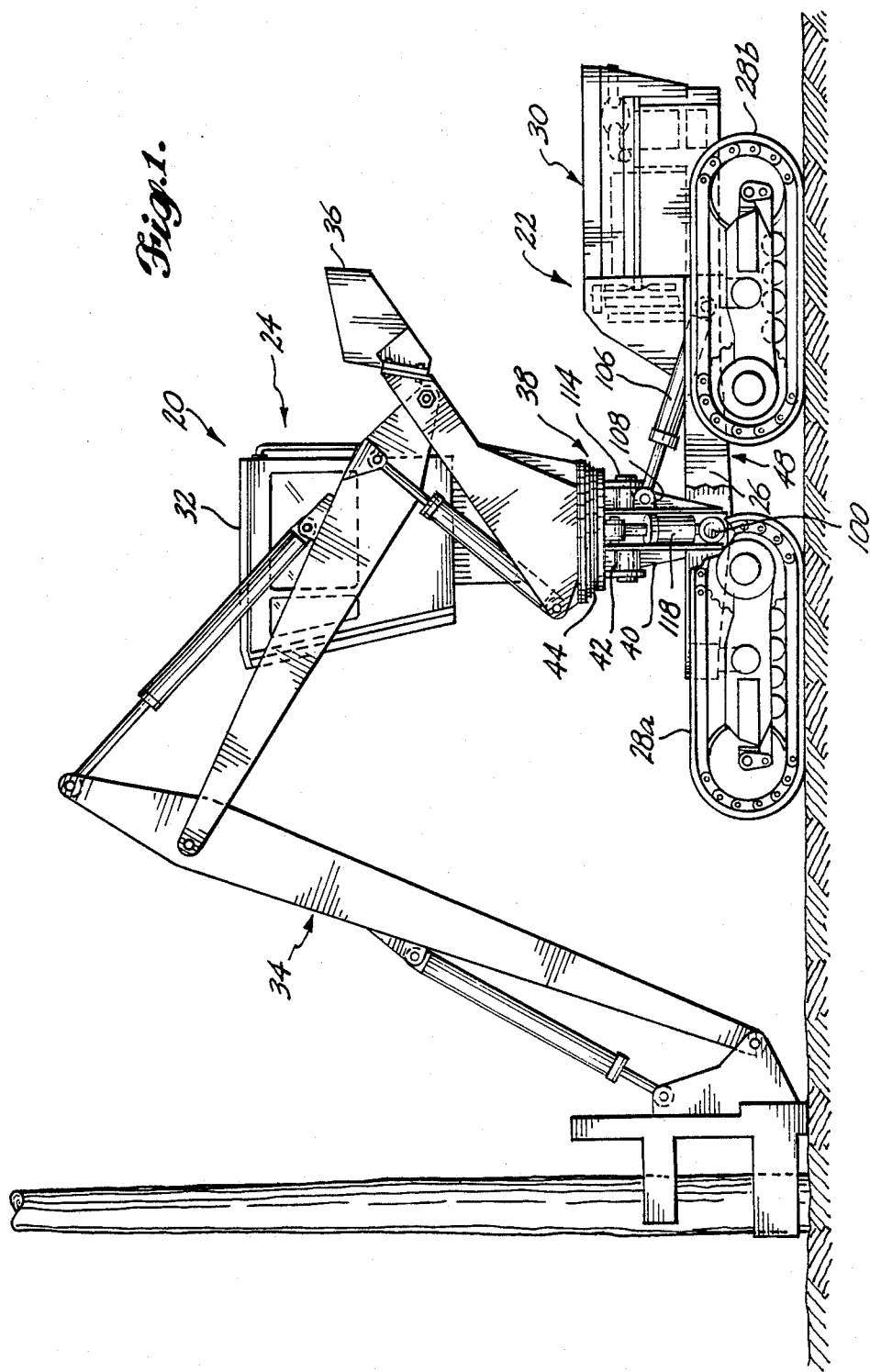
FIG. 1 is a side elevation view of the feller-buncher constructed in accordance with the present invention.
Figure 2:
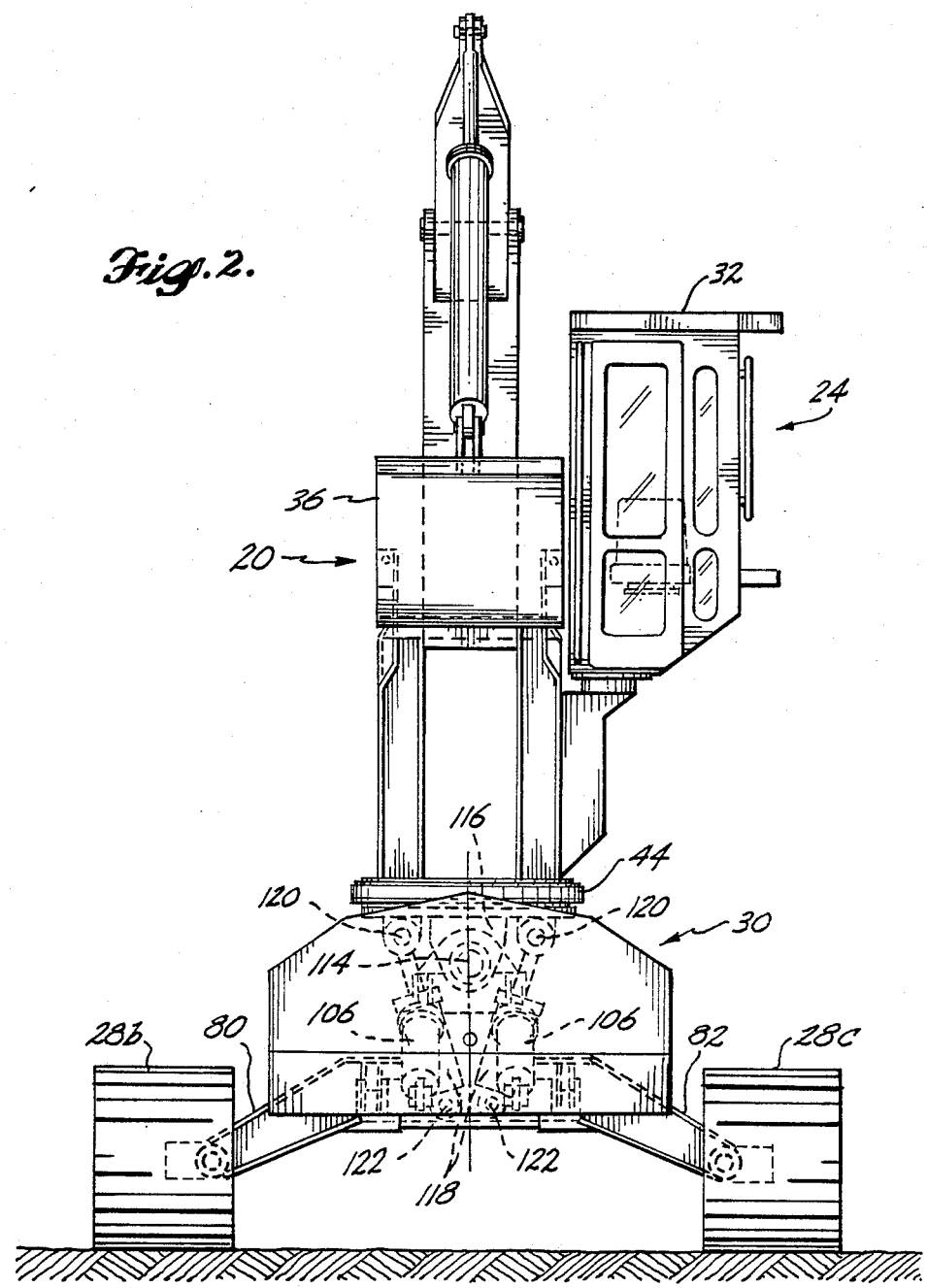
FIG. 2 is a rear elevation view of the feller-buncher.

Referring first to FIGS. 1 and 2, the feller-buncher 20 includes running gear 22 and an upper unit 24. The running gear comprises a chassis 26 mounted on endless track pods 28a through 28d. A prime mover 30, preferably a diesel engine, is mounted on the rear of chassis 26. The prime mover drives hydraulic pumps that are coupled by appropriate hydraulic lines to the linear and rotary hydraulic motors used to motivate the system. All motive power in the system is supplied from the engine and hydraulic pumps. The hydraulic system for a machine of this type is within the design capability of one of ordinary skill and, therefore, will not be addressed in any further detail.

The upper unit 24 comprises a cab 32 in which the operator resides, an articulated arm 34 having a cutting and grasping device at its extremity, and a counterweight 36. The counterweight is mounted on the opposite side of the cab from the arm to at least partially counterbalance the weight of the arm 34. The upper unit 24 is mounted on the chassis by a trunnion assembly 38 comprising a lower trunnion member 40 and an upper trunnion member 42. A turntable 44 is mounted on the upper trunnion member. The cab, counterweight and articulated arm are mounted on the upper section of the turntable 44 so that the upper unit can be rotated 360 degrees in either direction about a substantially upright or vertical axis, thus giving the machine the capability to operate in all directions without moving the running gear.

Referring now to FIG. 3, the running gear 22 and the trunnion assembly 38 will be described in more detail. The chassis 26 is a basic box frame 48 that comprises two laterally spaced, longitudinally extending frame members 50 and 52. The longitudinal frame members 50 and 52 are parallel and can comprise I beams or other structural members as required by the particular geometry, weight and size of a particular feller-buncher. The longitudinal frame members 50 and 52 are joined by two transverse frame members 54 and 56 to complete the box frame 48. The front frame member 54 is rigidly joined at its ends to the forward ends of the longitudinal members 50 and 52. The rear frame member 56 comprises a box assembly, including a forward end plate 56a, a rear end plate 56b, a top plate 56c that extends between the upper edges of plates 56a and 56b, and a bottom plate that extends between the lower edges of the end plates 56a and 56b thus forming a box member. The longitudinal members 50 and 52 are rigidly affixed to the rear frame member 56. The box frame 48 is constructed and designed so that it can twist about a generally longitudinal axis indicated by dot/dash line 58. As will be understood, the twisting capability of the box frame provides part of the suspension travel for the forward pods relative to the rear pods.

Still referring to FIG. 3, first and second rigid arms 66 and 68 are mounted on and extend outwardly from the forward ends of the box frame 48. The respective outer ends of the arms 66 and 68 carry pod mounting units 70 and 72. The pod mounting assembly 70 is mounted on the end of the arm 66 for limited swinging movement about a generally longitudinal axis indicated by the dot/dash line 74. Similarly, assembly 72 is mounted for limited swinging movement about a parallel longitudinal axis, indicated by dot/dash line 76. These pod mounting assemblies 70 and 72 will be described in more detail in conjunction with a later FIGURE.

Referring now to FIGS. 1 and 3, the pod 28a is mounted on the pod mounting assembly 70 in a conventional manner. The pod is mounted so that the entire pod can rotate about a generally transverse axis indicated by the line 78. A vertical line 75, extending through each of the pod-mounting assemblies 70 at the intersection of lines 74, 78, defines a tip boundary of the feller-buncher. The other pods are similarly mounted on their respective pod mounting assemblies. All of the pods employed with the feller-buncher and constructed in accordance with the present invention are constructed in a conventional manner, including a central walking beam, toothed wheels mounted at the end of the walking beam and an endless track draped over the toothed wheels. Each of the pods are independently powered by a hydraulic motor and in turn driven by the hydraulic pump coupled in a conventional manner to the prime mover powered hydraulic pump.

Referring back to FIG. 3, each of the end plates 56a and 56b forming part of the rear frame member have integral sidewardly extending flanges 60a and 60b, and 62a and 62b, respectively. The flanges 60a and 60b extend sidewardly from one side of the frame to form a yoke while the flanges 62a and 62b extend from the opposite side of the frame to form a second yoke. Pivoted pod mounting arms 80 and 82 are mounted respectively in the yoke formed by flanges 60a and 60b and the yoke formed by flanges 62a and 62b. The arms 80 and 82 are mounted for pivotal movement to the yokes via shafts 84 and 86 that are in turn journaled in conventional bearings mounted on the flanges. Thus, the arms 80 and 82 are mounted for pivotal movement about axes that are generally parallel to but offset from the longitudinal axis of the box frame 48. Pod mounting units 88 and 90, similar to those employed in conjunction with the fixed arms 66 and 68, mount the pods 28b and 28c to the arms 80 and 82. Pods 28b and 28c are substantially identical to pods 28a and 28d. Each of arms 80 and 82 carry a set of pawl assemblies 94 and 96, respectively, that engage ratchet-like serrations on the outer ends of the flanges 60a and 60b for pawl assembly 94 and flanges 62a and 62b for pawl assembly 96. These pawls are selectively engageable and disengageable with the serrations to selectively lock the arms 80 and 82 in a given position so that a downward force that is transmitted through the chassis to the pivot arms 80 and 82 will not cause an upward movement of the pivot arms. The operational purpose of these pawls will be described in more detail later.

Still referring to FIGS. 1, 2 and 3, the trunnion assembly 38 functions to maintain the upper unit 24 in an upright, and preferably vertical, orientation regardless of the orientation of the frame relative to the horizontal. The lower trunnion 40 is mounted for fore and aft swinging movement about an axis oriented generally transversely to the box frame 48 via a shaft 100 that is journaled in suitable bearings 102 and 104 affixed to the respective longitudinal frame members 50 and 52. The shaft is affixed to the lower end of the lower trunnion and supports the entire trunnion assembly. The lower trunnion 40 is powered for fore and aft movement about its transverse pivot axis by a pair of hydraulic cylinder 106. The piston arms of the hydraulic cylinders are coupled to suitable yokes 108 affixed to the upper end of the lower trunnion 40. The cylinders extend rearwardly and are coupled to the front of the rear transverse frame member 56, again via suitable yoke and pin assemblies 110. By retracting the piston arms of the hydraulic cylinders 106, the lower trunnion is pivoted backwardly. By extending the piston arms, the lower trunnion can be pivoted forwardly.

An upper trunnion 42 is pivotally coupled to the upper end of the lower trunnion unit via shaft 114. Shaft 114 is affixed to downwardly extending flanges 116 which in turn are affixed to the support plate 112 for the turntable 44. The shaft 114 is journaled in suitable bearings housed in the upper end of lower trunnion 40. Thus, the upper trunnion is mounted for swinging movement about an axis oriented generally longitudinally relative to the box frame 48. The upper trunnion 42 is powered for side-to-side swinging movement by a pair of hydraulic cylinders 118 mounted on opposite sides of the upper and lower trunion units. The piston arms of the piston and cylinder units 118 are coupled to suitable yokes 120 that are affixed to and extending downwardly from the bottom of the turntable support plate 112. The lower ends of the piston and cylinder units 118 are coupled to suitable yokes 112 affixed to the lower end of the lower trunnion 40. Extension and retraction of opposite hydraulic cylinder 118 will tilt the support plates 112 about the shaft 114. Thus, the upper and lower trunnions combine to provide a mechanism whereby the upper unit 24 can be maintained in an upright position as the running gear 22 is relatively angulated fore and aft, and/or sideways on a hill.

The unique design and location of the pivot axis for the lower and upper trunnion units allow a feller-buncher constructed in accordance with the present invention to angulate further and thus operate on steeper side hills than prior feller-bunchers. For example, the pivot axis for the lower trunnion unit defined by shaft 100 is well below the upper level of the frame and resides only slightly above the pivot axes for each of the pods 28. The engine is also slung low relative to the frame and is positioned well rearwardly of the pivot axis. This configuration allows the upper unit to swing 35 degrees in a forward direction relative to the frame and 35 degrees in a rearward direction relative to the frame. Again, because of the construction of the upper and lower trunnion units, the swing axis defined by the shaft 114 for the upper trunnion unit is also maintained at a low height relative to the frame. Moreover, the frame is free of encumbrances sidewardly of the upper unit. Thus, the upper unit is capable of high sideward angulation, up to 30 degrees, between the upper unit and the running unit. The capability of angulating the upper unit greater than 25 degrees in all directions from the frame is unique, and in fact, has never been achieved by any prior vehicle.

The capability of the upper unit to angulate relative to the running unit is illustrated in FIGS. 4, 5, 6 and 7. Referring first to FIG. 4, the fellerbuncher 20 is illustrated operating on a steep down slope with the articulated arm positioned ahead of the vehicle. The hydraulic cylinders 106 have been completely retracted to maintain the upper unit 24 in a vertical position. It will be noted that the center of gravity of the entire apparatus still resides within vertical lines 75 (FIG. 3.) traveling through the mounting locations for each of the pods. Similarly, in FIG. 5, the feller-buncher 20 is shown working on a slope with the articulated arm 34 extending upwardly from the front of the vehicle. In this mode of operation, the hydraulic cylinders 106 are fully extended to orient the upper unit 24 vertically while the running gear 22 is at a relatively steep angle.

In all positions shown in FIGS. 4 through 7, the center of gravity of the mass of the machine plus the rated load held by the arm 34 can, because of the unique geometry of the trunnion, be maintained inside the tip boundary of the machine. Generally, the tip boundary of the preferred embodiment of the machine having four pods is the box defined by vertical lines 75 running through the pod mounting units 70, 72, 88 and 90. This definition is precisely true in the fore and aft direction as illustrated in FIGS. 4 and 5. That is, if the center of gravity of the machine and its rated load moves, for example, in a downhill direction in FIG. 3 to the downhill side of the vertical line running through pod mounting unit 72, the machine will tip in the downhill direction. On a sidehill, the machine will tip when the center of gravity of the machine and its rated load is located outside of a vertical line that intersects the pod track at ground level at a location somewhere between the center of the track and the outside edge of the track. This intersection point will vary depending upon track design and rigidity. However, because the vertical line running through the center of the pod mounting unit for all practical purposes will line inside a vertical line running through the intersection point, the definition of the tip boundary is accurate but conservative.

Similarly, in FIG. 6, the feller-buncher 20 is shown operating on a side slope where the right side of the running gear 22 is situated on the downhill slope. The articulated arm is operating downhill from the unit. The hydraulic cylinders 118 have been adjusted so as to maintain the upper unit 24 in an upright, vertical position. The center of gravity of the feller-buncher is maintained between vertical lines running through the mounting locations for the pods despite the steep side slope. In FIG. 7, the articulated arm is shown operating on the upward side of the feller-buncher 20. Again, the hydraulic cylinders 118 are extended to maintain the upper unit 24 in a vertical position.

Figure 8:
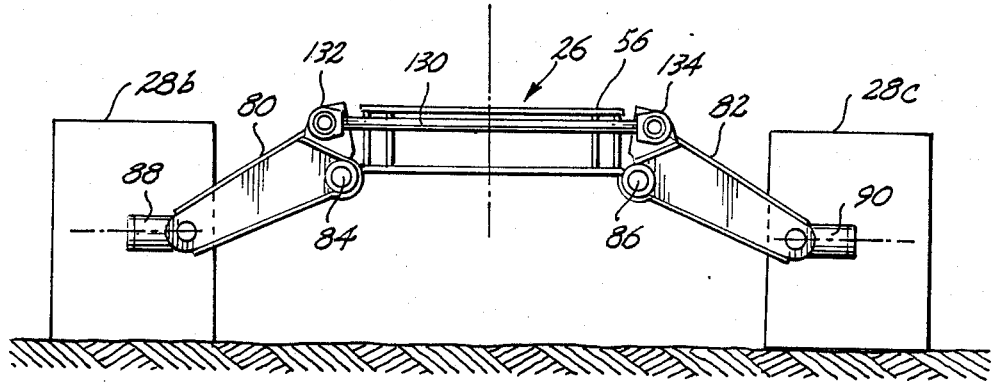
FIG. 8 is an enlarged view of one of the frame and pod-mounting pivot arms in a normal position.

As discussed above, the suspension of the feller-buncher allows significant twist in a box frame 48 which is complemented by the swinging capability of the rear pivot arms 80 and 82. Referring to FIG. 8, the chassis 26 is shown as it appears when the running gear 22 is situated on level ground. The front pod mounting arms and pods have been eliminated for clarity of illustration. The pivot arms 80 and 82 are coupled together via an interconnecting link 130. This link is parallel to a line drawn between the mounting shafts 84 and 86 for the pivot arms 80 and 82. The left end of the link 130 is coupled via a conventional yoke and pin assembly 132 to the left arm 80 at a location vertically offset from the arm mounting shaft 84. Similarly, the right end of the link 130 is mounted via a suitable yoke and pin assembly 134 to the upper end of the arm 82 at a location vertically offset from the right arm mounting shaft 86. Thus, the arms 80 and 82 are connected by a two-bar, parallel linkage.

Figure 9:
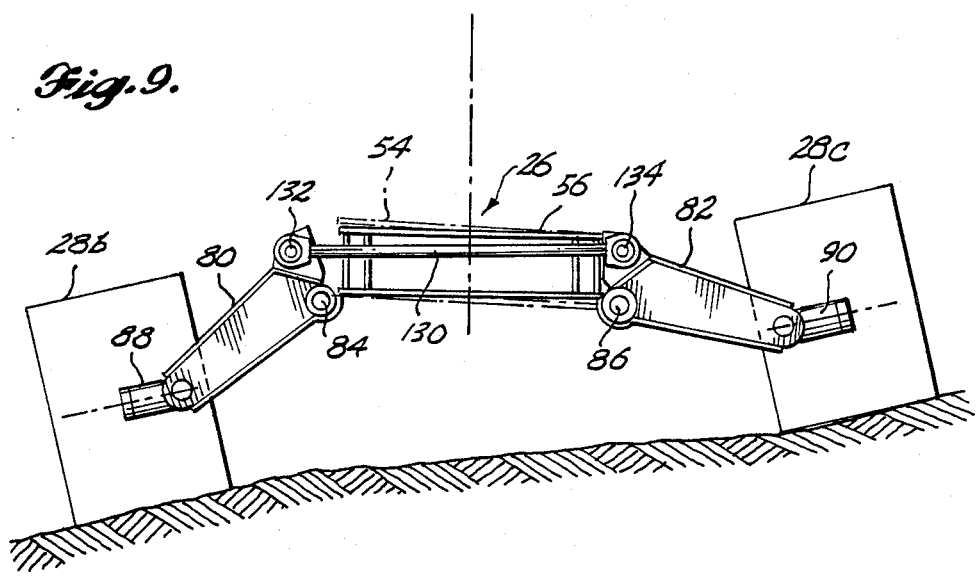
FIG. 9 is an enlarged side elevation view of the frame pivot and arm shown in a flexed position.

In FIG. 9 the suspension system is shown flexed to nearly its maximum extent. It will be noted that the front end of the box frame, seen as the upper edge of forward transverse frame member 54, has been twisted or torque relative to the rear transverse frame member 56. At the same time, the right arm 82 has been swung upwardly, while the left arm 80 has been swung downwardly by a substantially equal amount. As a consequence, in a preferred embodiment of the present invention, the left front pod can be vertically moved relative to the right front pod by a distance up to 28 inches, a significant suspension travel for a machine having a width of 13 feet and length of 20 feet. This significant suspension movement capability is made possible only by the combination of the pivoted rear pod mounting arms 80 and 82 combined with the capability of the box frame 48 to function as a torque box. In this manner, the running unit of the present invention can be negotiated over much more uneven terrain than is achievable with prior art units.

Figure 10:
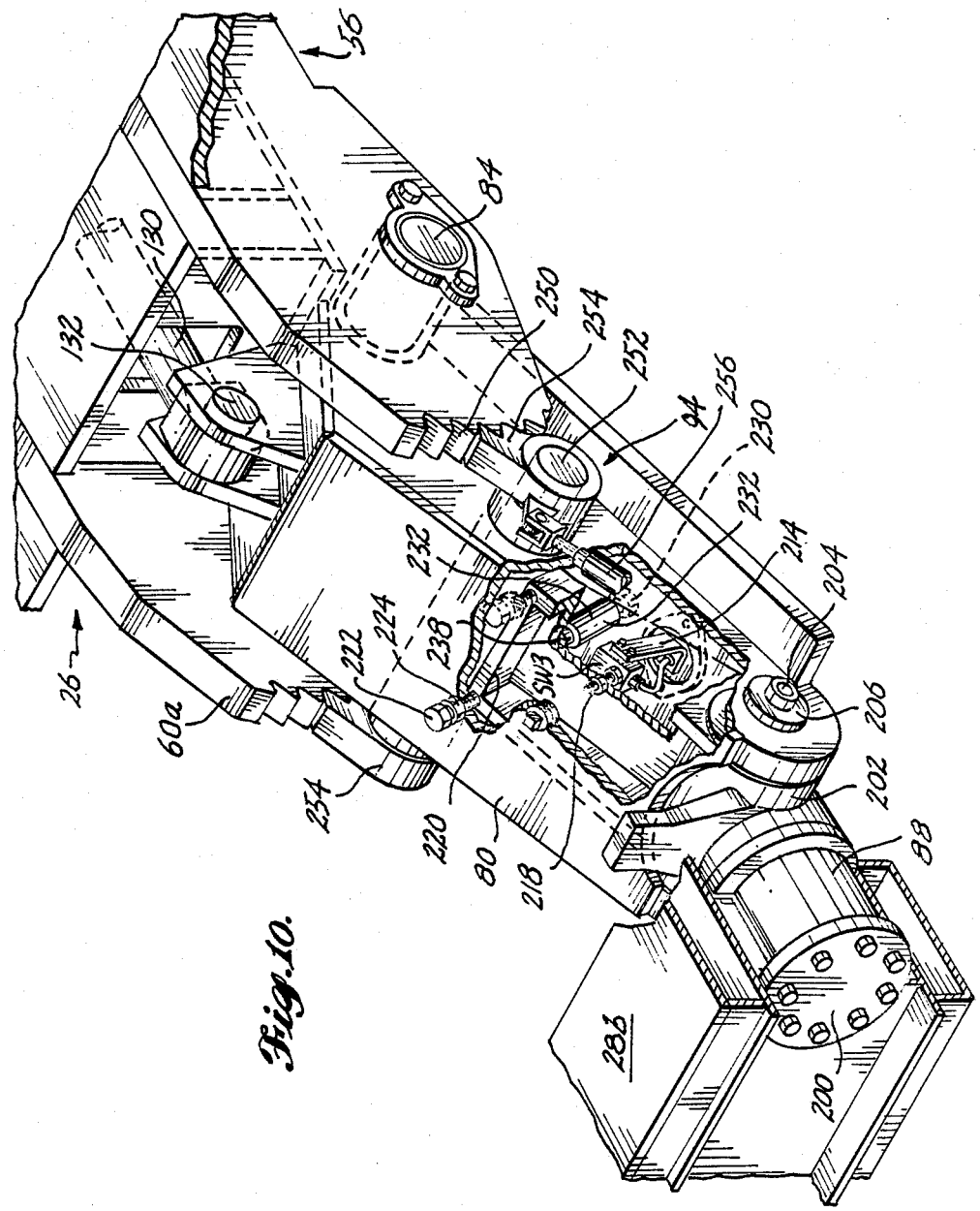
FIG. 10 is an isometric view, partially broken away, of a corner of the frame and one of the pivot arms, showing the stability locking system and the mechanism that senses when a pod is unweighted.
Figure 11:
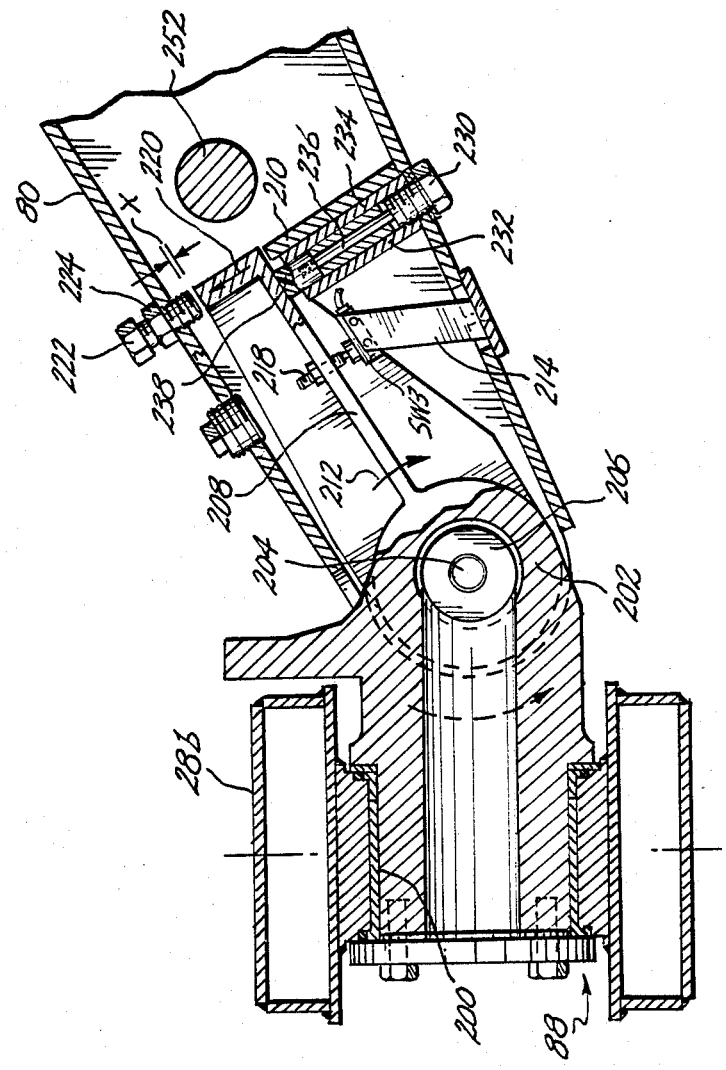
FIG. 11 is a longitudinal sectional view of the pivot arm shown in FIG. 10.

Referring now to FIGS. 10 and 11, the details of the system for sensing when a pod is unweighted and the system for locking the swinging arms in place will be discussed. The arm illustrated in FIG. 10 is the left rear pivot arm 80. While this arm is pivotally attached via shaft 84 to the chassis 26, the mechanism for mounting the pods and sensing when a pod is unweighted is the same for all four of the arms. The pod mounting unit 88 includes a hub assembly 200 to which the pod 28b is pivotally mounted. The hub assembly 200 is affixed to a crossmember 202, which in turn carries a mounting pin 206. The pin 206 is mounted in a pair of bearing assemblies carried by extensions of the arm 80 located on each side of the crossmember 202 (only one extension can be seen in FIG. 10). The pin 206 is locked in place in a conventional manner by a locking bolt 204. Thus, the pod is mounted to the arm 80 for swinging movement about an axis that is generally oriented longitudinally relative to the frame. An internal flange 208 that is affixed to the crossmember 202 extends into the interior of the pivot arm 80. The flanges 208 normally rests against a stop 210 which is affixed internally to the bottom of pivot arm 80. The flange 208 is mounted on the opposite side or inner side of the crossmember 202 from the pod. Thus, upward movement of the pod will cause downward movement of the flange 208. Thus, when the pod is weighted, the arm tends to be rotated in the direction of arrow 212 which causes the bottom side of the flange 208 to reside against the upper end of the stop 210.

A switch platform 214 is mounted internally on the arm between the stop 210 and the crossmember 202. The switch platform 214 carries a switch SW3 having a contact arm that abuts an adjustable contact arm stop 218 mounted on the flange 208. The switch SW3 is open when the pod is weighted. When the pod is unweighted, the pod will tend to swing in a downward direction, thus causing the flange 208 to swing in the opposite or upward direction as indicated by arrow 220. As the flange swings upwardly in the direction of arrow 220, the switch contact arm stop 218 also moves with the flange 208, thus allowing the switch arm of the switch SW3 to move and close the switch. As will be understood by one of ordinary skill, the switch can be normally closed or normally open depending upon how the ultimate electronic circuitry is designed. However, moving the switch arm so that the switch moves, for example, from an open position to a closed position, will complete a circuit which in turn can be coupled to provide a control signal to a logic circuit.

To eliminate a substantial amount of swinging movement of the pod 28b relative to the arm 80, a set of adjustable stops 222 are provided. The adjustable stops 222 comprise threaded bolts that extend through threaded apertures in the upper side of arm 80. Lock nuts 224 are provided on the threaded bolt. The threaded apertures are provided so that the end of the bolts are juxtaposed the upper end of the flange 208. The adjustable stops 222 can therefore be adjusted downwardly so as to allow only a predetermined amount of movement, as indicated by gap x, of the flange 208, and thus, a corresponding limited amount of movement by the pod 28b. While the pod mounting assembly and mechanism for sensing the unweighting of a pod has been explained only for one pod mounting arm, it is to be understood that each pod is similarly mounted to its respective mounting arm.

Figure 12:
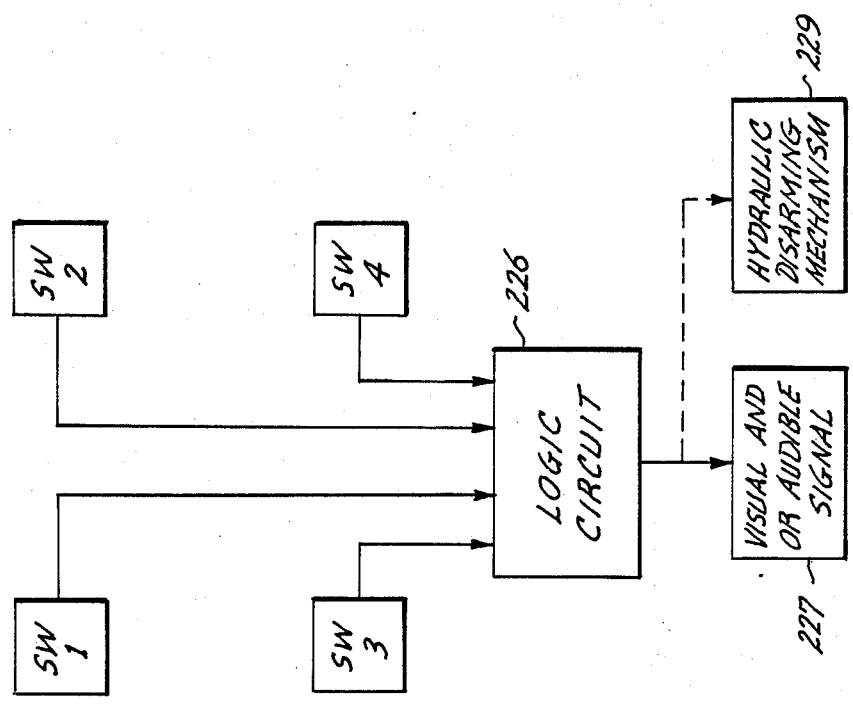
FIG. 12 is a block diagram illustrating the system for providing an audible or visual signal of an incipient tipping condition.

Referring now to FIG. 12, the system by which the unweighting of one or more pods is sensed by the microswitches associated with each of the mounting arms and pods are illustrated in context of a block diagram. Switches SW1, SW2, SW3 and SW4 are the microswitches corresponding to the switches in each of the arms and pods. Thus switch SW1 corresponds to a switch mounted within arm 66, switch SW2 within arm 68, switch SW3 within arm 80 and switch SW4 within arm 82. Each of these switches are biased toward a closed position, but are maintained in an open position when a respective pod is weighted. When any one of the pods is unweighted, its respective switch will be closed. A logic circuit 226 is provided so that when any two adjacent switches are closed, that is, switches SW1 and SW2, switches SW1 and SW3, switches SW2 and SW4, or switches SW3 and SW4, are closed (corresponding to any two adjacent pods being unweighted), the logic circuit provides an output signal that is directed first to a visual and/or audible signal 227 in the cab of the feller-buncher. Thus, if the right-hand pods are unweighted, switches SW2 and SW4 will be closed, indicating to the driver that he is in an incipient tipping condition. If desired, four separate signals can be provided for tip conditions to the left, right, forward and rear. However, in the preferred mode only a single audible and visual alarm is provided to the operator because the tipping direction is generally that direction in which the articulated arm is extended. In addition, if desired, the control signal can also be coupled to a disarming mechanism 229 to disable selected hydraulic equipment so that the machine can be operated only in a direction that will reduce the tipping condition of the vehicle. While this feature is desirable for some applications, many operators do not like to lose control of their equipment, and thus, it is presently preferred only to provide the operator a visual and audible signal.

Referring back to FIG. 11, it must be realized that a signal of incipient tipping condition is provided only when the pod is unweighted. Because the pod still is on the outside of the lever arm and is providing weight, the incipient tip condition is indicated well prior to the time that the vehicle will tip. For example, if the pod weighs 6,000 pounds and a loaded articulated arm is extended outwardly an equal distance from the tip point in the opposite direction from the pod so as to cause the pod to become unweighted, at the moment that the pod becomes unweighted, it would take an additional 6,000 pounds of downward force on the end of the articulated arm to cause the vehicle to actually tip. The amount of additional weight that would be required to tip the vehicle can be adjusted via the adjustment mechanism generally designated 230. The adjustment mechanism includes a threaded bolt that is threaded into an aperture in the lower portion of arm 80 situated between the switch platform 214 and the stop 210. The bolt is threaded into a channel defined by a tube 232 that extends upwardly toward the bottom side of the flange 208. A compression member 236 is positioned within the channel 234 between the bolt and a spacer 238. The compressible member is elastic so that as it is compressed between the arm 208 and the bolt 230 by threading the bolt inwardly, an increased force will be exerted against the bottom of the flange 208, thus preloading the flange in an upward or unweighted direction. The compressible member can comprise a high molecular weight polyethylene or other material that has an elastic memory but is extremely durable. Thus, for example, by threading the bolt so as to exert an upward pressure of approximately 3,000 pounds on the bottom side of the arm, the arm and the pod will begin to move when it will take nine thousand pounds of force on the arm to cause the vehicle to tip.

Figures 13A, 13B:
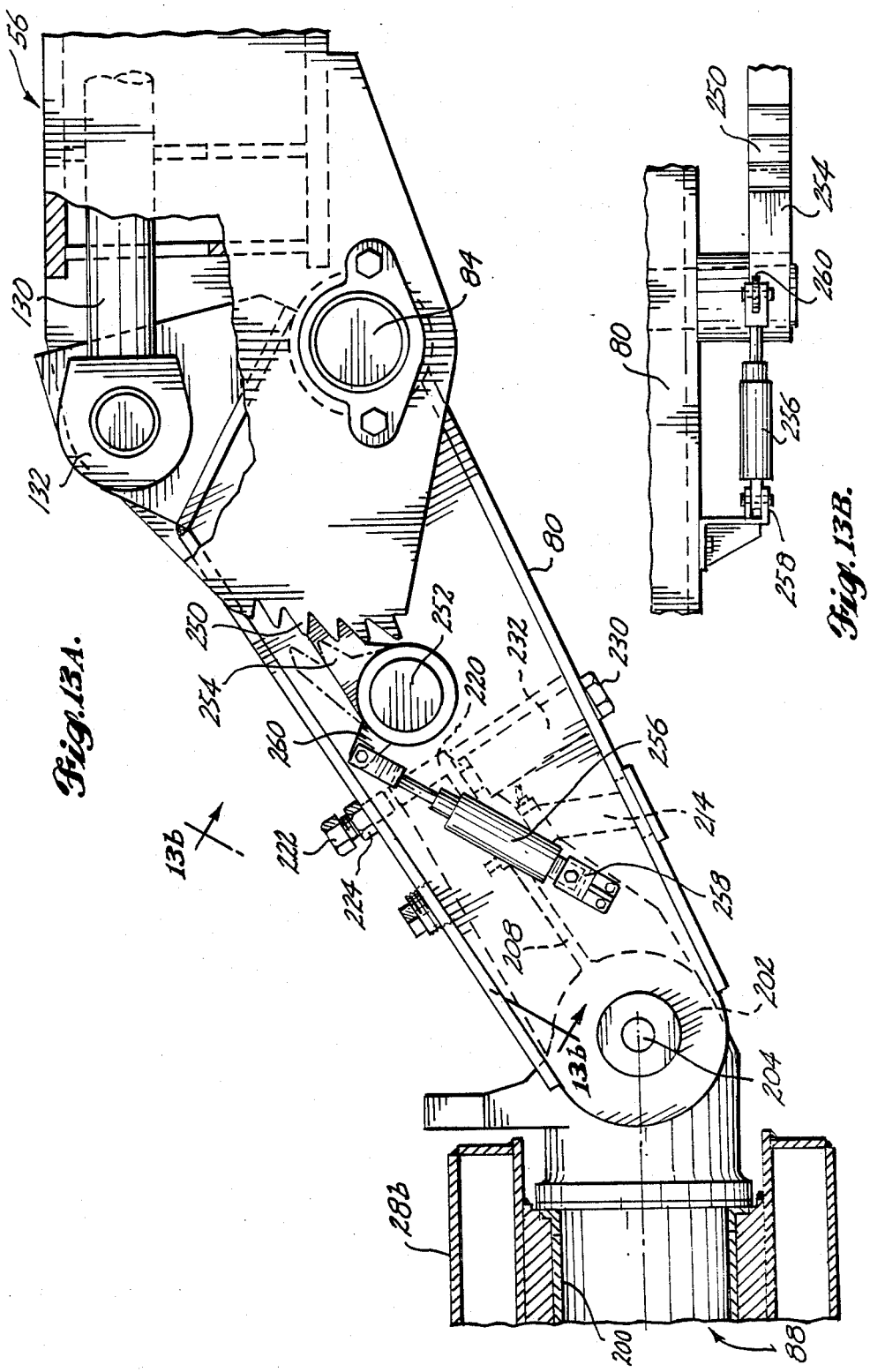
FIG. 13A is a rear elevation view of a corner of the box frame and a pivot arm showing the stability locking mechanism.
FIG. 13B is a top view of the stability locking mechanism shown in FIG. 13A.

Referring now to FIGS. 10, 13A and 13B, the ratchet mechanism for locking a pod mounting arm to the frame when the vehicle is in a working, nontravel mode is associated only with the pivoted pod mounting arms. As previously explained, the outwardly extending flanges 60a and 60b forming part of the rear transverse frame member 56 carry teeth 250 that are generally oriented in a vertical direction. A longitudinally oriented shaft 252 is mounted for rotation in and extends through the arm 80. Pawls 254 are mounted on each end of the shaft 252 on the outside of the arm. The pawls are constructed so that rotation of the shaft in a clockwise direction will cause the pawls to engage the teeth 250, and rotation of the shaft 252 in a counterclockwise direction (as viewed from the rear) will cause the pawls to disengage from the teeth 250. The shaft is rotated by a remotely actuatable, hydraulic cylinder 256 mounted on the rear side of the arm 80. The cylinder is coupled to a suitable flange 258 on the arm, while the piston arm of the cylinder assembly is coupled to a flange 260 that extends upwardly from the rear pawl 254. Thus, retraction of the cylinder assembly 256 will cause the pawls to disengage from the teeth and extension of the cylinder assembly will cause the pawl to engage the teeth. While the pawl and ratchet mechanism for only the left pivot arm has been described, a similar, but mirror image mechanism is associated with the right pivot arm.

Figure 14:
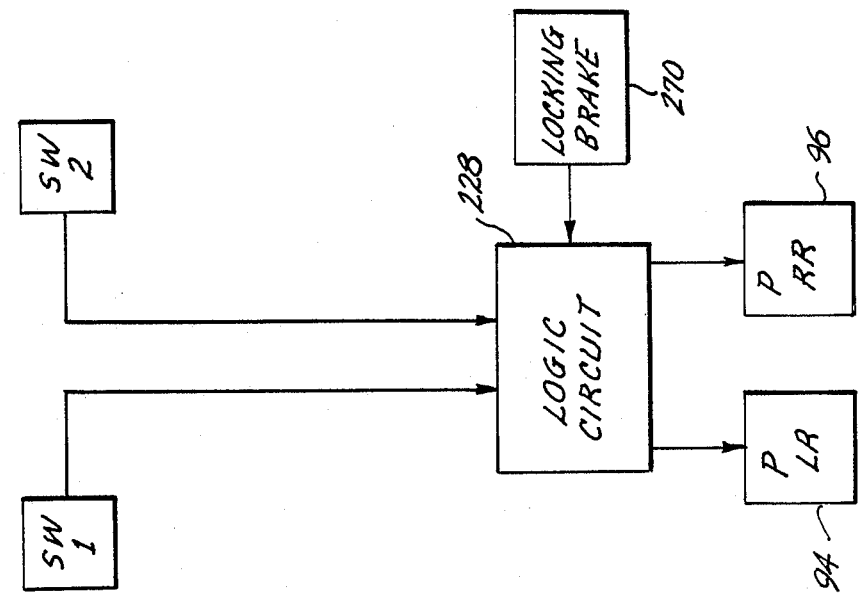
FIG. 14 is a block diagram of the system for controlling the stability locking mechanism.

Referring to FIG. 14, a logic circuit 228 is again provided to control the engagement and disengagement of the pawl from the teeth. The logic circuit 228 can be combined with circuit 226 or can be separate, if desired. Whenever the machine is in a travel mode, the pawls normally are disengaged. However, when the machine is positioned in a working, nontravel mode, the pawls are engaged. One example of how the pawls can be engaged is by the actuation of a parking brake 270, which would indicate that the machine or vehicle is not going to be moved. Thus, actuation of the parking brake can provide a signal to a logic circuit which in turn will engage both pawl assemblies 94 and 96 on the left- and right-hand sides of the vehicle. Because the teeth 250 and the pawl have a certain amount of pitch to ensure engagement, it is possible for a pawl to become frictionally locked to its corresponding teeth so that it will not disengage when the machine is to be moved. To prevent this from happening, the pawls are disengaged upon the unweighting of selected ones of the pods. Thus, the same switches SW1-SW2 are coupled to the logic circuit 228 for controlling the pawls. For example, when the left front pod is unweighted, a signal will be sent to the logic circuit which in turn will send a control signal to the control valve for the hydraulic cylinder assembly 256 that controls the pawl on the left rear arm to cause retraction of the cylinder assembly, thus disengaging the pawl. Similarly, when the right front pod is unweighted, and switch SW2 provides a control signal to the logic circuit, the pawl on the left rear arm will be disengaged. In this manner, an inadvertent locking of the pawl and ratchet mechanism can be avoided.

As a substitute for the parking brake engagement and disengagement of the pawls, the operator can be provided with a three position switch that allows him to manually set or release the pawls in first and second switch positions, respectively. In a third position, the pawl engagement could be automatically controlled by tapping the hydraulic line for the steering and travel functions of the machine and using a change (increase) in hydraulic pressure in those lines for providing a control signal that can then be used to initiate engagement or disengagement of the pawls.

The present invention has been described in relation to a preferred embodiment and several alternate embodiments. One of ordinary skill after reading the foregoing specification will be able to make various alterations, substitutions of equivalents and other changes without departing from the broad concepts disclosed herein. It is therefore intended that the Letters Patent issuing hereon be limited only by the definition contained in the appended claims and equivalents thereof.

The embodiments of the invention in which an exclusive property or privilege is claimed are defined as follows:

1. A multi-track vehicle especially adapted for operation on steep slopes, comprising:
    a frame having a longitudinal dimension and a transverse dimension, said frame being mounted on track pods disposed on opposite lateral sides of the frame and having opposite ends;
    a first trunnion and means mounted said first trunnion to a central portion of said frame for swinging movement about a transverse axis;
    a second trunnion and means mounting said second trunnion to said first trunnion for swinging movement about an axis oriented longitudinally relative to said frame;
    a turntable and means mounting said turntable to said second trunnion for rotational movement about a generally upright axis;
    an upper unit mounted on said turntable; and
    pod-connecting means for connecting each of the pods to the frame, vertical lines through each of the pod-connecting means defining a tip boundary of the machine, opposite ends of said pods being offset from said first trunnion sufficiently in a longitudinal direction and said pods being offset from said second trunnion sufficiently in a transverse direction to allow a center of gravity of said entire vehicle and upper unit to remain inside the tip boundary of said machine when said upper unit is upright and said frame is angulated in any direction relative to the horizontal.

2. The vehicle of claim 1 in which the upper unit includes a cab and an articulated arm for carrying a rated load and the pods are offset so that the center of gravity remains inside the tip boundary when the frame is angulated greater than 25 degrees relative to horizontal.

3. The vehicle of claim 1, wherein said trunnions and mounting means are capable of angulating the upper unit at least up to 30 degrees in any direction from the frame.

4. The vehicle of claim 1, wherein said first trunnion and mounting means are positioned so that the transverse axis is below the upper level of said frame.

5. The vehicle of claim 1, wherein the pods include first and second pods connected at one longitudinal end of the frame and third and fourth pods connected at the opposite end of the frame, including a prime mover mounted on the frame between the third and fourth pods.

6. The vehicle of claim 5, wherein the first trunnion and mounting means is connected to the frame at a position spaced longitudinally closer to the first and second pods than to the third an fourth pods.

7. The vehicle of claim 5, wherein said first trunnion and mounting means are positioned so that the transverse axis is below the upper level of said frame.

8. The vehicle of claim 1 in which the upper unit includes an articulated arm for carrying a rated load and counterweight means disposed diametrically opposite the articulated arm about said generally upright, rotational axis for counterbalancing the articulated arm and load.

9. A logging vehicle according to claim 8 in which the articulated arm includes means on a distal end of the arm for carrying a tree trunk as said rated load.

10. A logging vehicle according to claim 9 further including means for cutting a tree trunk.

11. The vehicle of claim 1, wherein the pods include first and second pods connected at one longitudinal end of the frame and third and fourth pods connected at the opposite end of the frame and the first trunnion and mounting means is connected to the frame at a position spaced closer to the first and second pods than to the third and fourth pods and such that the transverse axis is below the upper level of said frame, including a prime mover mounted on the frame between the third and fourth pods.

12. The vehicle of claim 11 in which the upper unit includes an articulated arm for carrying a rated load and counterweight means disposed diametrically opposite the articulated arm about said generally upright, rotational axis for counterbalancing the articulated arm and load.

13. The vehicle of claim 1, wherein the pods include first and second pods connected at one end of the frame and third and fourth pods connected at the opposite end of the frame and the pod-connecting means include means for connecting said third and fourth pods to the frame for pivotal movement about substantially parallel axes that are oriented in a generally longitudinal direction.

14. The vehicle of claim 1, wherein the pods include first and second pods connected at one end of the frame and third and fourth pods connected at the opposite end of the frame and the pod-connecting means include first, second, third, and fourth means for connecting said first, second, third, and fourth pods to the frame for pivotal movement about substantially parallel axes that are oriented transversely to said frame.

15. The vehicle of claim 1 wherein said frame comprises at lease one longitudinal member and a pair of spaced transverse members interconnecting said longitudinal member to form a semi-rigid frame providing limited twisting about a generally longitudinal axis.

16. A multi-track vehicle especially adapted for operation on sloped, irregular terrain, comprising:
 a frame having a longitudinal dimension and a transverse dimension;
 first and second track pods disposed on opposite lateral sides of one longitudinal end of the frame;
 third and fourth track pods disposed on opposite lateral sides of an opposite end of the frame;
 an upper unit including a cab;
 turntable means mounting the upper unit for rotation about a rotational axis; and
 tiltable means mounting the turntable means and upper unit on the frame for tilting the turntable means and upper unit about a longitudinal axis aligned with the longitudinal dimension of the frame and a transverse axis aligned with the transverse dimension of the frame to position said rotational axis angularly relative to the frame;
 pod-connecting means for connecting each of the pods to the frame, vertical lines through each of the pod-connecting means defining a tip boundary of the machine; and
 a prime mover mounted on the frame between the third and fourth pods;
 the tiltable means being connected to the frame at a position spaced longitudinally closer to the first and second pods than to the third and fourth pods;
 said pods being offset from the longitudinal axis sufficiently in a transverse direction and opposite ends of said pods being offset from said transverse axis sufficiently in a longitudinal direction to allow a center of gravity of said entire vehicle and upper unit to remain inside the tip boundary of the vehicle when the upper unit is upright and the frame is angulated in any direction relative to horizontal.

17. The vehicle of claim 16, wherein said tiltable means is positioned such that the transverse axis is below the upper level of said frame.

18. The vehicle of claim 16 in which the upper unit includes an articulated arm for carrying a load and counterweight means disposed diametrically opposite the articulated arm about said rotational axis for counterbalancing the articulated arm and load.

19. The vehicle of claim 16, wherein the podconnecting means include first means for connecting said pods to the frame for pivotal movement about substantially parallel axes that are oriented transversely to said frame.

20. The vehicle of claim 16, wherein the podconnecting means each include second means for connecting said third and fourth pods to the frame for limited pivotal movement about substantially parallel axes that are oriented generally longitudinally of the frame.

21. The vehicle of claim 16, wherein the first, second, third and fourth pods are connected to the frame by transversely-extending arms, the first and second arms being rigidly connected to the frame and the third and fourth arms being pivotally connected to the frame providing a limited range of vertical movement of the third and fourth pods.

22. The vehicle of claim 21 including means actuable for locking the third and fourth pivot arms in selectable positions relative to the frame.

* * * * *

UNITED STATES PATENT AND TRADEMARK OFFICE
CERTIFICATE OF CORRECTION

PATENT NO. : 4,823,852

DATED : April 25, 1989

INVENTOR(S) : Frederic E. Langford

It is certified that error appears in the above-identified patent and that said Letters Patent is hereby corrected as shown below:

On the cover page:

Line 9 of references, "2/1971 Mueller" should be -- 3/1971 Mueller --

In the specification

Column 6, line 29, "112" should be -- 122 --;

line 63, "fellerbuncher" should be -- feller-buncher --.

Column 8, line 29, after "206." add the following sentence: -- The pin 206 is oriented longitudinally relative to the frame. --;

UNITED STATES PATENT AND TRADEMARK OFFICE
CERTIFICATE OF CORRECTION

PATENT NO. : 4,823,852

DATED : April 25, 1989

INVENTOR(S) : Frederic E. Langford

It is certified that error appears in the above-identified patent and that said Letters Patent is hereby corrected as shown below:

line 38, "flanges" should read -- flange --.

Signed and Sealed this

Twenty-fifth Day of September, 1990

Attest:

HARRY F. MANBECK, JR.

*Attesting Officer*　　　　*Commissioner of Patents and Trademarks*